Patented Aug. 15, 1933

1,922,205

UNITED STATES PATENT OFFICE 1,922,205

2-CARBOXY-5-AMINO DIPHENYL

William S. Jones and William Braker, Brooklyn, N. Y., assignors to E. R. Squibb & Sons, Brooklyn, N. Y., a Corporation of New York No Drawing. Application January 26, 1932
Serial No. 589,039

1 Claim. (Cl. 260—109)

This invention relates to 2-carboxy-5-amino diphenyl. This has proved to be a valuable compound particularly for use as an intermediate in the production of therapeutically active compounds. Our copending application Serial No. 632,789 filed September 12, 1932, refers to such a therapeutically active derivative.

This compound is advantageously prepared from 2-amino-5-nitro diphenyl. This is diazotized and then at an elevated temperature treated with a cyanide to form the nitrile, viz. 2-cyano-5-nitro diphenyl. This nitrile is hydrolyzed to form the corresponding carboxylic acid and the nitro group is then reduced to form 2-carboxy-5-amino diphenyl. The intermediate compounds formed at various steps in the process are indicated in the following equation:

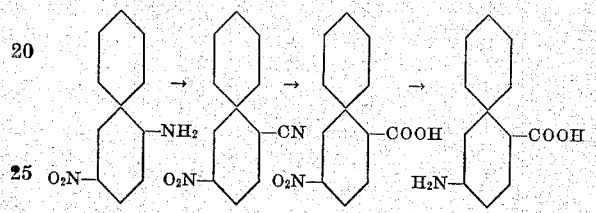

The method of preparation given below refers to a laboratory operation. From the results there given the man skilled in the art can produce a plant batch of any desired quantity. The 2-amino-5-nitro diphenyl which is used as the starting material may be prepared by the method given in the Journal of the Chemical Society, vol. 2, 1928, page 2774, or preferably by hydrolysis of 5-nitro-2-para-toluene sulfone amido diphenyl.

25.0 grams of 2-amino-5-nitro diphenyl is dissolved in 24.0 cc. of hydrochloric acid (concentrated) contained in 75 cc. of water. The solution is diazotized with 10.44 grams of sodium nitrite; the excess nitrite is destroyed by the addition of solid urea. This diazonium solution is added over a period of about one-half hour to a solution of potassium copper cyanide kept at 90° C. This cyanide solution may be prepared by dissolving 50.0 grams of crystalline copper sulfate and 56.0 grams of potassium cyanide in sufficient water to bring the total to 300 cc. The reaction mixture is heated for six hours during which a crop of brown crystals form. These crystals are filtered and washed free of inorganic matter. The nitrile, viz. 2-cyano-5-nitro diphenyl thus obtained is recrystallized from alcohol. This compound has been found to have a melting point of 132—134° C.

5.2 grams of the nitrile is suspended in a solution consisting of 75 cc. of glacial acetic acid, 60 cc. of sulfuric acid and 50 cc. of water. The mixture is refluxed for about eight hours. The resulting solution is diluted with an equal volume of water. The hydrolysis of the nitrile produces a crystalline substance which is filtered off. This compound is washed with water and dried in vacuo. It is the 2-carboxy-5-nitro diphenyl.

3.0 grams of the 2-carboxy-nitro diphenyl are reduced with 10.0 grams of tin and 50 cc. of hydrochloric acid. The reduction is carried on for three hours and the tin is then precipitated out as the sulfide. The sulfide is filtered off and the filtrate evaporated to small volume. The hydrochloride of 2-carboxy-5-amino diphenyl is crystallized out from the resulting solution in the form of silvery leaflets.

We claim:

The compound, 2-carboxy-5-amino diphenyl.

WILLIAM S. JONES.
WILLIAM BRAKER.